United States Patent [19]

Sugawara et al.

[11] Patent Number: 5,054,029
[45] Date of Patent: Oct. 1, 1991

[54] PULSE POWER SUPPLY CIRCUIT

[75] Inventors: Hiroyuki Sugawara, Hitachi; Tuneyoshi Oohashi, Hitachiota, both of Japan

[73] Assignee: Hitachi, Ltd., Tokyo, Japan

[21] Appl. No.: 464,213

[22] Filed: Jan. 12, 1990

[30] Foreign Application Priority Data

Jan. 25, 1989 [JP] Japan .................................. 1-013945

[51] Int. Cl.$^5$ .............................................. H01S 3/00
[52] U.S. Cl. .............................................. 372/38; 372/69
[58] Field of Search ................... 372/38, 69; 315/160, 315/173, 360, 362, 154

[56] References Cited

U.S. PATENT DOCUMENTS

| | | | |
|---|---|---|---|
| 3,515,938 | 6/1970 | Morse | 372/38 |
| 3,609,588 | 9/1971 | McKnight | 372/38 |
| 3,749,976 | 7/1973 | Colyn | 372/38 |
| 4,061,986 | 12/1977 | Barker | 372/38 |
| 4,330,737 | 5/1982 | Orban | 315/171 |
| 4,549,091 | 10/1985 | Fahlen et al. | 372/38 |

FOREIGN PATENT DOCUMENTS 0281486 11/1988 Japan ..................................... 372/69

Primary Examiner—Léon Scott, Jr.
Attorney, Agent, or Firm—Antonelli, Terry, Stout & Kraus

[57] ABSTRACT

In a pulse power supply circuit, first and second charging capacitors are connected in series with a discharge device. First and second gas-filled control switching elements, connected in parallel with each other, are respectively connected in series with the first and second charging capacitors. First and second pulse power sources are respectively connected in parallel with the first and second control switching elements and also respectively connected in series with the first and second charging capacitors so as to charge the capacitors alternately. A control circuit controls the first and second control switching elements so that the switching elements alternately and repeatedly at substantially equal time intervals.

14 Claims, 2 Drawing Sheets

PULSE POWER SUPPLY CIRCUIT

BACKGROUND OF THE INVENTION

This invention relates to a pulse power supply circuit for lasers, including gas-filled control switching elements, and more particularly to a power supply circuit for pulsed lasers suitable for high pulse repetition rates of over 1 kHz.

In conventional power supply circuits for pulsed lasers, each including a plurality of gas-filled control switching elements connected in parallel, a plurality of parallel gas-filled control switching elements (referred to as thyratrons for short) are arranged to form the plasma at the same time as described in page 22 of the prelease of papers for 1987 Research Results Report Session by the Laser Technology R&D Laboratory and in the prerelease of papers for the 35th Applied Physics Joint Lecture of 1988, 30P-ZL-14. The simultaneous, parallel operating of thyratrons is executed to lighten the load for the thyratrons and prolong their service life. However, since the closing time is on the order of nsec, it is extremely difficult to have the simultaneous closure occur stably for a long time. The gas-filled control switching element has a characteristic that the allowable voltage and the allowable peak voltage decrease as the repetitive operation rate is increased. These allowable upper limits are determined by the product (pb: anode dissipation factor) of the three values: voltage, repetition rate, and peak voltage of the switching element. However, the repetition rate has the upper limit to which the switching element can be used in a suitable manner, and it is technically difficult to use a switching element beyond the maximum allowable repetition rate. Generally, gas-filled control switching elements have the maximum allowable repetition rates, and are used at less than the maximum allowable repetition rate.

It is a trial practice to use a plurality of gas-filled control switching elements connected in parallel and thereby increase the allowable current proportional to the number of elements employed when they are used at or under the maximum allowable repetition rate. The repetition rate of switching elements is determined by the insulation property recovery speed: therefore, if a voltage is applied to the switching element before the insulation property recovers, there is a fear that dielectric breakdown occurs. The insulation property recovery speed is higher for smaller current flowing through the switching element. However, the insulation resistance changes exponentially from several ohms during conduction of the switching element to several hundred megohms during recovery of the insulation property For example, even if the current flowing through the switching element is reduced to, say, 1/10, the insulation property recovery time In actuality, for gas-filled control switching elements, actual conditions more than this maximum allowable repetition rate has not been determined definitely. There is the difficulty concerning the high repetition rate in this respect.

Generally, for the gas-filled control switching elements, the pb value determines the limit values as mentioned above. The inventor of this patent application has found that the allowable voltage falls notably at repetition rates greater than the maximum allowable repetition rate, and that this voltage hardly of varies with the current value. For example, when the repetition rate was 5 kHz, the allowable voltage was 16 kV and the allowable power was 4 kW. On the other hand, at a repetition rate of 2.5 kHz, the switching element was operable up to an allowable voltage of 21 kV and an allowable power of 5.5 kW. Accordingly, when two gas-filled control switching elements were connected in parallel and operated simultaneously, the allowable voltage was 16 kV and the allowable power was 8 kW at a repetition rate of 5 kHz. In contrast, according to this invention, when switching elements were operated alternately, the switching elements were operable at an allowable voltage of 21 kV and an allowable power of 11 kW at a total repetition rate of 5 kHz.

SUMMARY OF THE INVENTION

A first object of this invention is to overcome technical difficulties described above and provide a pulse power supply circuit for lasers, including gas-filled control switching elements connected in parallel, which operates stably at high voltages when it is required to operate at a repetition rate exceeding the maximum allowable repetition rate of 1 kHz.

A second object of this invention is to provide a power supply circuit for pulsed lasers which prevents the application to the other switching element of a high reverse voltage that develops at the load terminal while one switching element is operating when a plurality of gas-filled control switching elements are connected in parallel and operated alternately.

A third object of this invention is to provide a pulse power supply circuit for pulsed lasers, including saturable reactors in the circuit, to reduce power loss of the switching elements when a plurality of gas-filled control switching elements are connected in parallel and operated alternately.

A fourth object of this invention is to provide a pulse power supply circuit for lasers, including saturable reactors and reset reactors to reset the saturable reactors.

The first object can be achieved by providing a control unit to control the firing of a plurality of gas-filled control switching elements such that the firing occurs alternately or by turns and repeatedly at substantially equal intervals.

Means for achieving the other objects will be disclosed in the description of the following embodiments.

DESCRIPTION OF THE PREFERRED EMBODIMENTS

Figure 1:
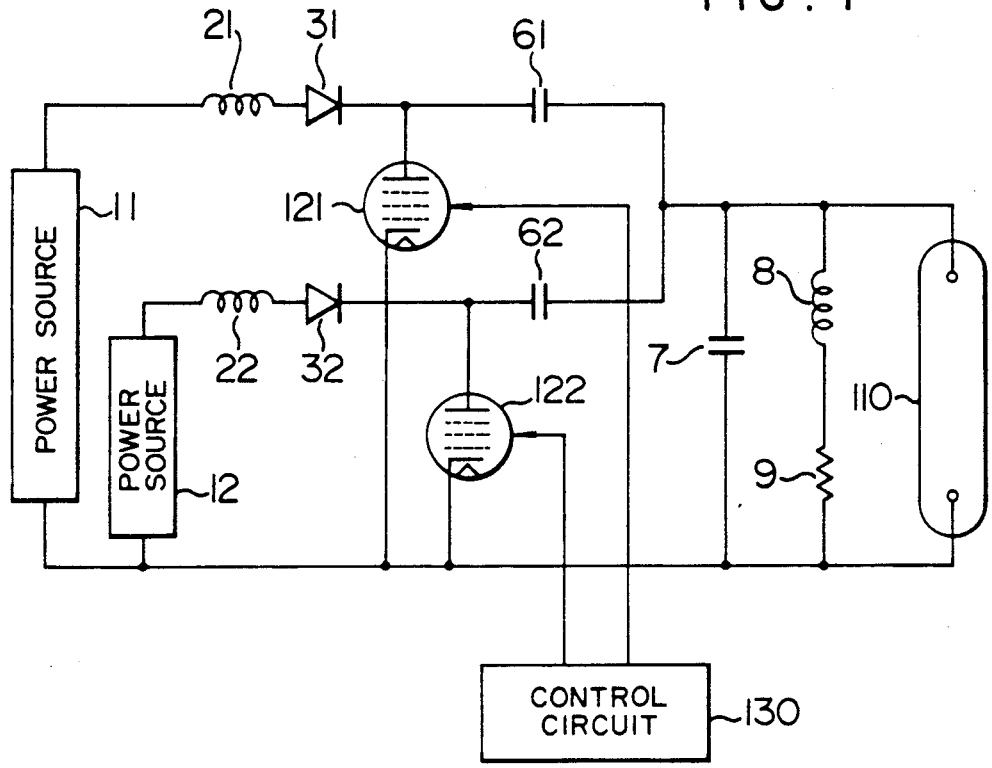
FIG. 1 shows a pulse first embodiment of a power supply for lasers according to the present invention.

FIG. 1 shows a first embodiment of a power supply circuit according to this invention.

In FIG. 1, two gas-filled switching elements 121 and 122 and two charging capacitors 61 and 62 are used. When the switching elements 121 and 122 are in "open" or off state and the two capacitors 61 and 62 are charged respectively to twice the values of the supply voltages from high-voltage power sources 11 and 12, the charging are completed. The discharge of the stored charge to the power sources 11 and 12 is inhibited by diodes 31 and 32. Under this condition, the one switching element 121 "closes" or turns on by a control signal from a control unit 130. Whereupon, the charge of the capacitor 61 moves to a capacitor 7 for adjusting the peak voltage, and the voltage rises in the capacitor 7. Then, a discharge device 110 starts discharging, and when the current attenuates sufficiently, the switching element which has been in "closed" or turned on state recovers its insulation property and returns to the initial or off state. The capacitor 62 connected to the switching element 122, which did not operate, maintains the charged state. As the switching element 121 assumes the insulation-recovered state, the capacitor 61 which discharged the charge is charged by the high-voltage power source 11. When the charging is completed, the switching element 122 which did not operate is "closed" or turned on by a control signal from the control unit 130. This operation is repeated by the switching elements 121 and 122 alternately at the same intervals.

The switching element 121 will be described in greater detail. The switching element 121 functions as an electric switch which closes the electric circuit in response to a control pulse signal from the control circuit 130. The switching element 121 is incapable of "opening" action, but recovers its insulation property and returns to the initial state when a current of a predetermined value flows through the switching element 121 for a predetermined time period.

When the switching element 121 is in "open" state, the charging capacitor 61 is charged by the high-voltage power source 11 through conduction of a current through a reactor for resonance and charging 21, a diode 31, a charging capacitor 61, a reactor for charging 8, a resistor for charging 9, and the high-voltage power source 11. If the inductance of the reactor for resonance, charging 21 is denoted by L, the capacitor of the charging capacitor 61 by $C_1$, and the charging resistor 9 by R, and $\sqrt{L/(2 \times C_1)} > R$ holds, the charging capacitor 61 is charged by a voltage twice that of the high-voltage power source. The moment the charging is completed, the switching element 121 is "closed". Whereupon, the charge in the charging capacitor 61 moves to the capacitor for peak voltage adjustment 7, and when voltage of the capacitor 7 rises to a certain value, the discharge device (discharge tube) 110 starts discharging, and is excited so that laser oscillation can take place by discharging. After the current attenuates sufficiently and thereafter, after passage of a predetermined time, when the switching element recovers its insulation property sufficiently, the capacitor 61 is charged again from the high-voltage power source 11. The same operation takes place with the other switching element.

In the foregoing operation, if the switching elements operate at 1 kHz, for example, the discharge device discharges at 2 kHz. In other words, the discharge device discharges at a repetition rate twice as high as the switching elements. By this means, the switching elements can be used at high working voltages.

In the foregoing description, DC power sources are used for the high voltage power sources. Accordingly, in this embodiment, charging is started immediately after the switching elements operate. However, this is a severe condition for the switching elements. With this in mind, if charging is started the moment the other switching element has completed its operation, a sufficient time can be secured for recovery of the insulation property. Specifically, the high-voltage power sources should preferably be high-voltage pulse power sources which supply power alternately.

Figure 2:
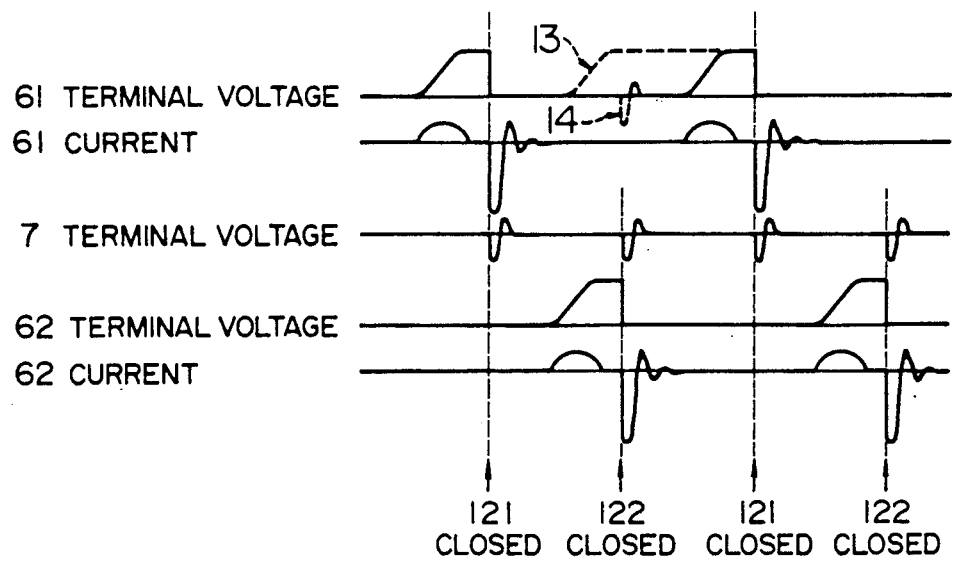
FIG. 2 shows waveforms of voltages and currents of components of the pulse power supply circuit for lasers according to the present invention.

FIG. 2 shows the terminal voltages across the capacitors 61, 62, 7, and the current waveforms of the capacitors 61 and 62 when high-voltage pulse power sources to supply power alternately are used for the high-voltage power sources 11 and 12 shown in FIG. 1. The curves 13 and 14 indicated by the dotted lines in FIG. 2 show the waveforms when the high-voltage power sources 11 and 12 are DC high-voltage power sources. After the switching element 121 closes and the current of the capacitor 61 attenuates, charging of the capacitor 62 is started. With DC power sources, as indicated by the dotted line 13, immediately after the switching element 121 closes and the current of the capacitor 61 attenuates, charging of the capacitor 62 is started. In other words, when the switching element 122 closes, the voltage has already risen.

In case high-voltage pulse power sources to supply power alternately are used for the high-voltage power sources 11 and 12, when the switching element 122 closes, the capacitor 61 is not yet charged. Therefore, the high-voltage side terminals of the switching elements have the same voltage as the capacitor 7 and the voltage indicated by the dotted line 14 is applied to the switching elements. The dielectric strength of the switching elements against a reverse voltage is relatively low. Therefore, application of the falling voltage (reverse voltage) of the terminal voltage of the capacitor 7 is, in fact, severe to the switching elements.

Figure 3:
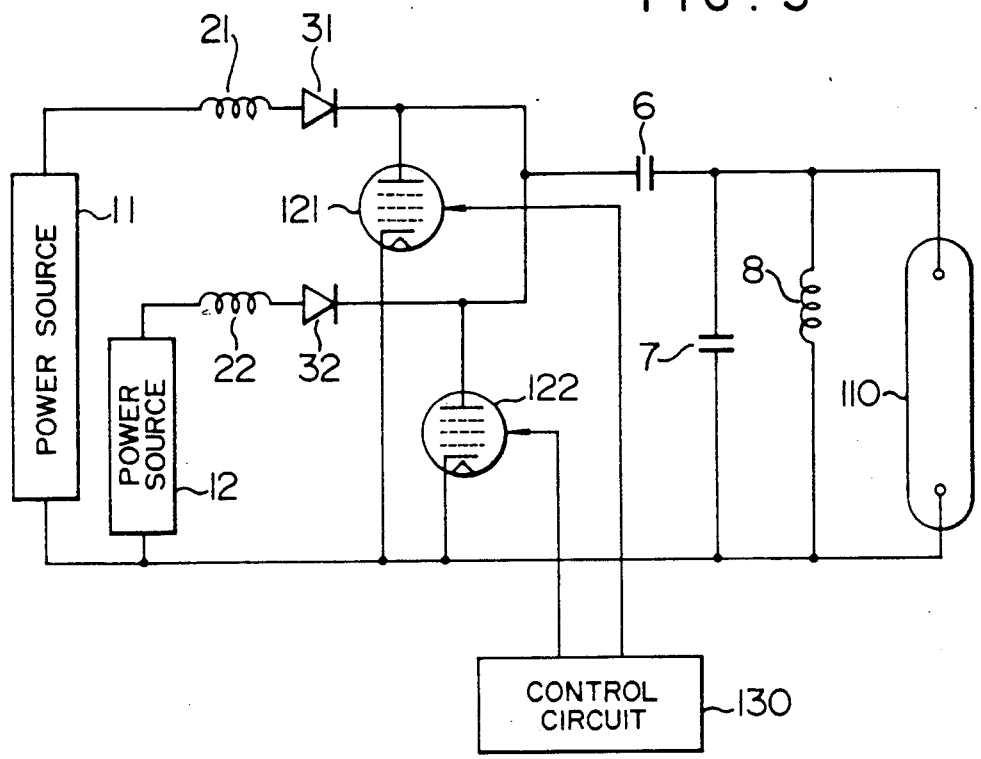
FIG. 3 shows a second embodiment of the power supply circuit according to the present invention.

FIG. 3 shows a second embodiment of the present invention. In order to prevent the application of the above-mentioned reverse voltage, a capacitor 6 is used commonly for the switching elements. In the second embodiment, the switching elements connected in parallel are conducting when they are in operation, and therefore, the reverse voltage is not applied to the switching elements. However, before one switching element operates, a charging voltage of the charged capacitor 6 is applied to the other switching element. To lessen the severity of use, high-voltage pulse power sources are used which supply power alternately by high-voltage power sources 11 and 12. In the operation of both sides, charging is started after the other switching elements recovers its insulation property sufficiently.

Figure 4:
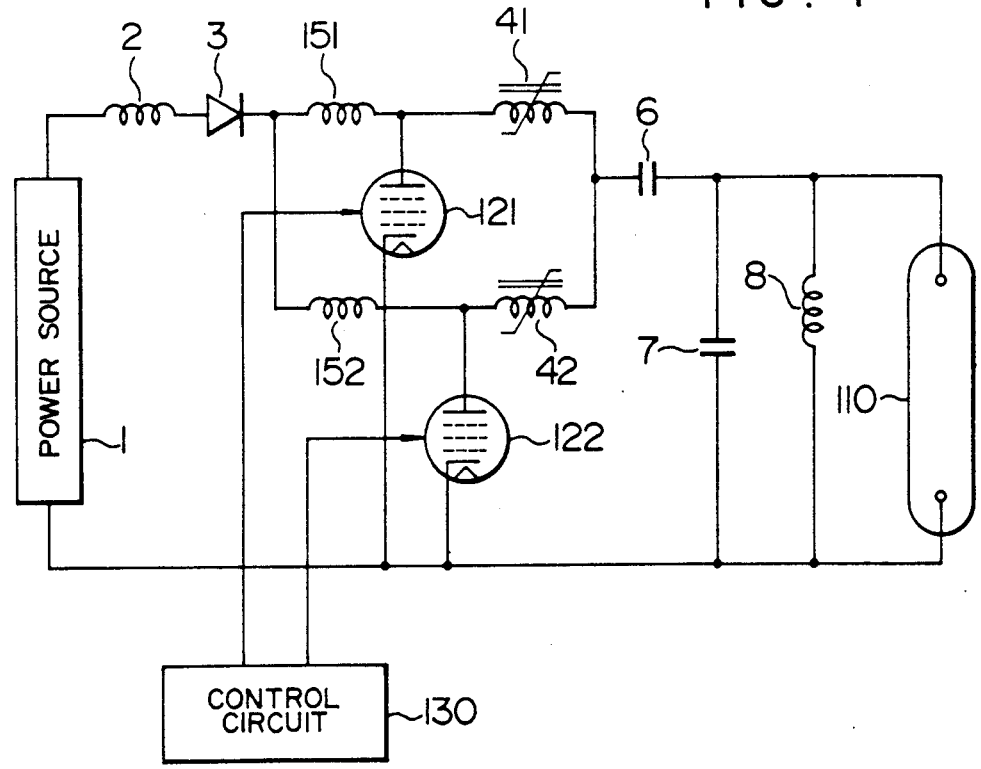
FIG. 4 shows a third embodiment of the power supply circuit according to the present invention.

FIG. 4 shows a third embodiment of the present invention. Reactors 151 and 152 for resetting saturable reactors are connected to the saturable reactors 41 and 42. But for the reactors 151 and 152, the saturable reactor which operates next is not necessarily reset. Since the two saturable reactors 41 and 42 are arranged in perfect parallel form, it is not clear through which saturable reactor the charging capacitor 6 is charged. The saturable reactors 41 and 42 are saturated in the direction in which a current flows when the charging capacitor 6 is charged. Therefore, when a control switching element (a thyratron) is closed, the current which is to flow in the saturable reactor tries to flow in the direction opposite to the direction in which the saturable reactor is saturated. Therefore, the saturable reactor works as a large resistance for a fixed time period. For this fixed period of time when the current is small, the switching element comes to be in the conducting state, and while the resistance of the switching elements is high, a large current is prevented from flowing through the switching element.

The saturable reactor 41 is a ring-shaped iron core formed of a magnetic material such as ferrite and has a characteristic that the internal magnetic flux is saturated suddenly when the magnetic flux density exceeds a certain value. The saturable reactor is arranged such that a magnetic flux passes through the center of the core. The saturable reactor has a large inductance until the iron core is saturated. When the iron core is saturated, the inductance is reduced. Having this property, a saturable reactor is used as a switch in a pulse circuit.

In the third embodiment of this invention, the reactors 151 and 152 are connected between the gas-filled control switching elements 121 and 122, and the power source 1, and a voltage corresponding to the voltage drop across one saturable reactor is applied to the other saturable reactor. This voltage is considerably lower than the charging voltage, but since the charging time is long, the saturable reactors can be saturated sufficiently. Therefore, since both saturable reactors 41 and 42 are saturated in the direction in which the capacitor 6 is charged, it is possible to securely soften the severe operating condition for the switching elements 121 and 122 when they are closed.

We claim:

1. A pulse power supply circuit comprising:
   a parallel circuit including a discharge device and capacitor;
   a series circuit connected in series with said parallel circuit and including a plurality of gas-filled switching elements connected in parallel and at least one charging capacitor connected with at least one of said switching elements;
   at least one high-voltage power source for charging said at least one charging capacitor; and
   control means for controlling said plurality of gas-filled switching elements so that said switching elements are turned on alternately and repeatedly at substantially equal time intervals.

2. The power supply circuit according to claim 1, wherein said series circuit includes a common charging capacitor connected to each of said plurality of gas-filled switching element.

3. The power supply circuit according to claim 2, wherein said series circuit includes saturable reactors each connected in series with one of said gas-filled switching elements.

4. The power supply circuit according to claim 2, wherein said series circuit includes saturable reactors connected between said gas-filled switching elements and said common charging capacitor.

5. The power supply circuit according to claim 4, wherein said series circuit includes reactors connected between said gas-filled switching elements and said at least one high-voltage power source, and wherein said common charging capacitor is charged by said at least one high-voltage power source for charging the common charging capacitor through said reactors and saturable reactors.

6. A pulse power supply circuit according to claim 5, wherein said least one high-voltage power source includes a pulse power source having a series of positive and negative polarities which ar alternately changed, and wherein said common charging capacitor is charged through a first pair of said reactor and saturable reactor when said pulse power source has a positive polarity, and said common charging capacitor is charged through a second pair of said reactor and saturable reactor when said pulse power source has a negative polarity.

7. The power supply circuit according to claim 1, wherein said series circuit includes saturable reactors each connected in series with one of said gas-filled switching elements.

8. The power supply circuit according to claim 1, wherein said series circuit includes saturable reactors connected between said gas-filled switching elements and said at least one charging capacitor.

9. The power supply circuit according to claim 8, wherein said series circuit includes reactors connected between said gas-filled switching elements and said at least one high-voltage power source, and wherein said at least one charging capacitor is charged by said at least one high-voltage power source for charging the at least one charging capacitor through said reactors and saturable reactors.

10. A pulse power supply circuit according to claim 9, wherein said at least one high-voltage power source includes a pulse power source having a series of positive and negative polarities which are alternately changed, and wherein said at least one charging capacitor is charged through a first pair of said reactor and saturable reactor when said pulse power source has a positive polarity, and said at least one charging capacitor is charged through a second pair of said reactor and saturable reactor when said pulse power source has a negative polarity.

11. A power supply circuit comprising:
    discharge means;
    first and second charging capacitors, each of said first and second charging capacitors being connected in series with said discharge means, for exciting said discharge means;
    first and second gas-filled switching elements connected in parallel with each other and respectively connected in series with said first and second charging capacitors;
    first and second pulse power sources, respectively connected in parallel with said first and second switching elements and also respectively connected in series with said first and second charging capacitors to supply power alternately to said charging capacitors; and
    a control circuit for controlling said first and second switching elements so that said first and second switching elements are turned on alternately and repeatedly at substantially equal time intervals.

12. A power supply circuit arrangement comprising:
    discharge means;
    a single charging capacitor, connected in series with said discharge means, for exciting said discharge means;
    first and second gas-filled control switching elements, respectively connected in series with said single charging capacitor and also connected in parallel with each other;
    first and second pulse power sources, respectively connected in parallel with said first and second control switching elements and also respectively connected in series with said single charging capacitor; and
    a control circuit for controlling said first and second control switching elements so that said first and second control switching elements turn on alternately and repeatedly at substantially equal time intervals.

13. A power supply circuit arrangement, comprising:
discharge means;
a single charging capacitor, connected in series with said discharge means, for exciting said discharge means;
first and second gas-filled switching elements, respectively connected in series with said single charging capacitor and also connected with each other;
a single pulse power source connected in parallel with said first and second control switching elements and also connected in series with said single charging capacitor;
first and second saturable reactors connected between said single charging capacitor and said first and second switching elements;
first and second reset reactors, connected between said first and second switching elements and said pulse power source, for resetting said first and second saturable reactors; and
a control circuit for controlling said first and second switching elements alternately and repeatedly at substantially equal time intervals.

14. A power supply method comprising the steps of:
charging a first charging capacitor connected in series with a discharge device;
turning on a first gas-filled switching element connected in series with said first charging capacitor;
discharging said discharge device in response to the turn on of said first switching element;
charging a second charging capacitor connected in series with said discharge device;
turning on a second gas-filled switching element connected in series with said second charging capacitor after the elapse of a time determined by a high repetition frequency of a pulse power supply following the turn on of said first switching element; and
discharging said discharge device in response to the turn of said second control switching element.

* * * * *